US008310947B2

(12) United States Patent
Hwang (10) Patent No.: US 8,310,947 B2
(45) Date of Patent: Nov. 13, 2012

(54) WIRELESS NETWORK ACCESS USING AN ADAPTIVE ANTENNA ARRAY

(75) Inventor: Timothy H. Hwang, Philadelphia, PA (US)

(73) Assignee: Empire Technology Development LLC, Wilmington, DE (US)

( * ) Notice: Subject to any disclaimer, the term of this patent is extended or adjusted under 35 U.S.C. 154(b) by 611 days.

(21) Appl. No.: 12/490,702

(22) Filed: Jun. 24, 2009

(65) Prior Publication Data

US 2010/0329192 A1 Dec. 30, 2010

(51) Int. Cl.
*H04W 4/00* (2009.01)
(52) U.S. Cl. ........ 370/252; 370/328; 370/339; 342/368; 455/562.1
(58) Field of Classification Search ........................ None
See application file for complete search history.

(56) References Cited

U.S. PATENT DOCUMENTS

| | | | |
|---|---|---|---|
| 5,917,446 A | 6/1999 | Greenspan | 342/373 |
| 5,920,286 A | 7/1999 | Mohebbi | |
| 5,929,811 A | 7/1999 | Rilling | |
| 6,362,781 B1 | 3/2002 | Thomas et al. | |
| 6,463,303 B1 * | 10/2002 | Zhao | 455/562.1 |
| 6,611,231 B2 | 8/2003 | Crilly et al. | |
| 6,690,747 B2 | 2/2004 | Petrus et al. | |
| 6,735,445 B2 | 5/2004 | Sharony et al. | |
| 6,894,643 B2 | 5/2005 | Guo et al. | |
| 6,907,245 B2 | 6/2005 | Ohlsson et al. | |
| 6,970,682 B2 | 11/2005 | Crilly et al. | |
| 6,993,334 B2 * | 1/2006 | Andrus et al. | 455/437 |
| 7,010,055 B2 * | 3/2006 | Harrison et al. | 375/267 |
| 7,099,698 B2 | 8/2006 | Tarokh et al. | |
| 7,109,919 B2 | 9/2006 | Howell | |
| 7,224,685 B2 | 5/2007 | Procter, Jr. | |
| 7,272,408 B2 | 9/2007 | Dalal et al. | |
| 7,388,540 B1 * | 6/2008 | Zogg et al. | 342/370 |
| 7,414,577 B2 | 8/2008 | Mohamadi | |
| 7,420,507 B2 | 9/2008 | Thomas et al. | |
| 7,426,198 B2 | 9/2008 | Mondal et al. | |
| 7,599,714 B2 | 10/2009 | Kuzminskiy | |
| 7,876,268 B2 | 1/2011 | Jacobs | |
| 2001/0005685 A1 | 6/2001 | Nishimori et al. | 455/562.1 |
| 2003/0013450 A1 | 1/2003 | Wang et al. | |
| 2003/0064752 A1 | 4/2003 | Adachi et al. | |
| 2004/0178907 A1 | 9/2004 | Cordoba | 340/539.21 |
| 2006/0146754 A1 | 7/2006 | Bejerano | |
| 2007/0147361 A1 | 6/2007 | Lee | |

(Continued)

OTHER PUBLICATIONS

Smart Antennas to expand Wi-Fi Range, accessed at computerworld.com on Jan. 17, 2008.

(Continued)

*Primary Examiner* — Chi H. Pham
*Assistant Examiner* — Shick Hom
(74) *Attorney, Agent, or Firm* — Carlineo, Spicer & Kee, LLC (57) ABSTRACT

Techniques described herein generally relate to systems, devices and methods for determining a wireless access point for a communications device in a wireless network. In some examples, the communications device may be assigned to a default wireless access unit in response to a request from the communications device for wireless access, where the default wireless access unit may provide the communications device with wireless access. A default wireless access unit may be arranged to monitor the network activity of the communications device to determine if the network activity satisfies a pre-determined condition, where the communications device may be re-assigned to an adaptive wireless access unit when the pre-determined condition is satisfied.

19 Claims, 8 Drawing Sheets

U.S. PATENT DOCUMENTS

| | | | |
|---|---|---|---|
| 2007/0197164 A1 | 8/2007 | Sheynman et al. | 455/41.2 |
| 2008/0014941 A1 | 1/2008 | Catovic et al. | |
| 2008/0238688 A1 | 10/2008 | Rofougaran et al. | |
| 2009/0225879 A1* | 9/2009 | Kloos et al. | 375/260 |
| 2010/0060523 A1* | 3/2010 | Yamazaki et al. | 342/377 |
| 2010/0194629 A1 | 8/2010 | Craig et al. | |

OTHER PUBLICATIONS

Bandspeed, Inc.—Product FAQs, accessed at bandspeed.com on Oct. 2, 2008.

Bandspeed, Inc.—AirMaestro 3100AG Virtual Controller Starter Kit, accessed at bandspeed.com on Oct. 2, 2008.

Getting the Most out of MIMO, accessed at atheros.com on Jan. 14, 2008.

UWB Signal Sources, Antennas & Propagation, accessed at picosecond.com on Jan. 14, 2008.

A Brief History of UWB Antennas, accessed at coe.montana.edu on Jan. 14, 2008.

* cited by examiner

WIRELESS NETWORK ACCESS USING AN ADAPTIVE ANTENNA ARRAY

CROSS REFERENCE TO RELATED APPLICATIONS

This application is related to U.S. patent application Ser. No. 12/201,381, filed Aug. 29, 2008, now U.S. Pat. No. 8,126,486, entitled Adaptive Antenna Weighting System for Wireless Local Area and Personal Area Networks; U.S. patent application Ser. No. 12/201,403, filed Aug. 29, 2008, entitled Method and System for Adaptive Antenna Array Pairing; and U.S. patent application Ser. No. 12/201,415, filed Aug. 29, 2008, entitled Weighting factor Adjustment in Adaptive Antenna Arrays.

BACKGROUND

This disclosure generally relates to adaptive antenna arrays, and more specifically to applications of adaptive antenna arrays in wireless networks.

Adaptive antenna arrays contain multiple antenna elements that are capable of changing their radiation pattern. Such arrays may be implemented in wireless access points to provide a secure communications channel to a communications device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

In the Drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 1:
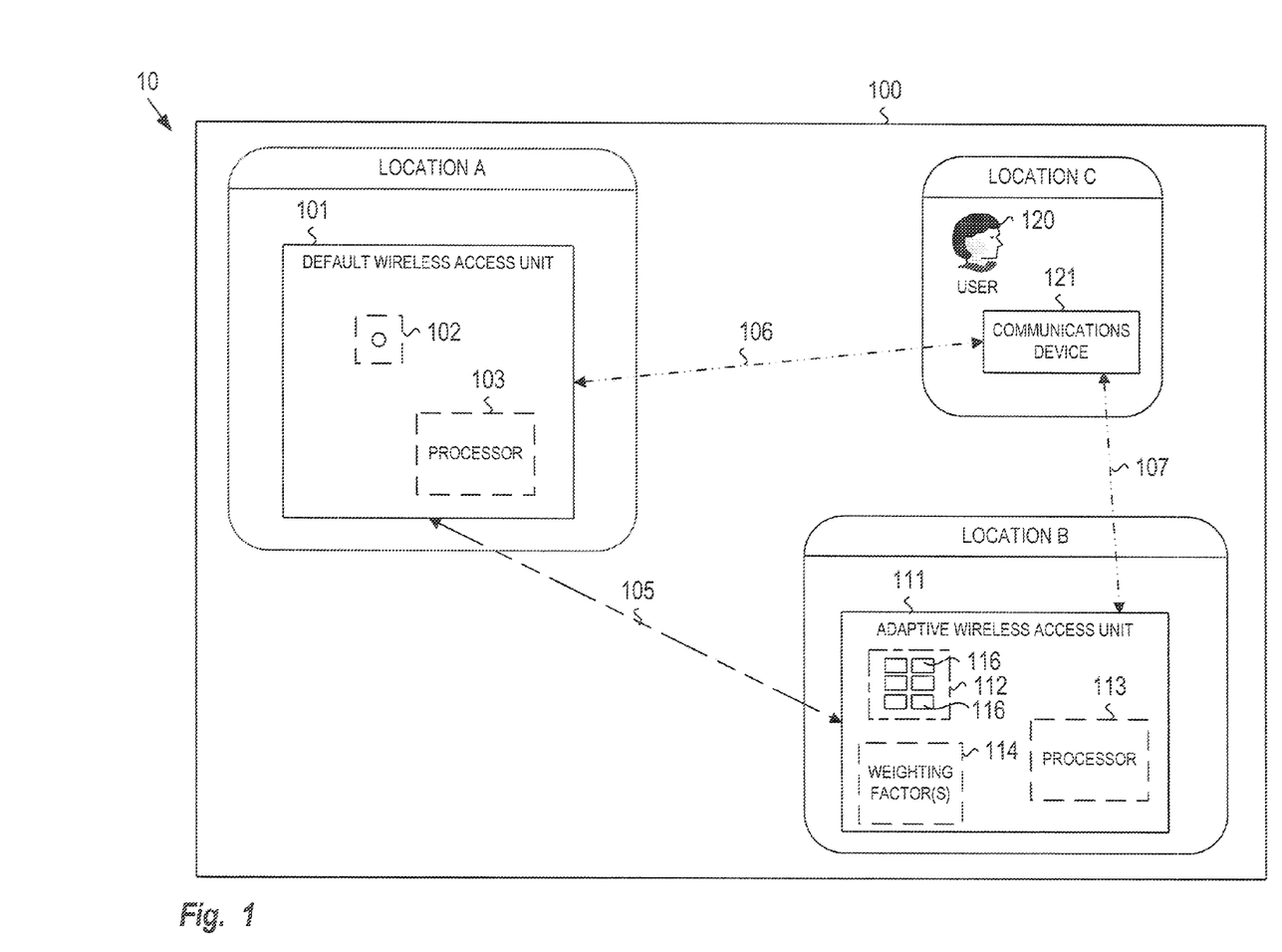
FIG. 1 is a system diagram illustrating an adaptive antenna array system in a wireless network according to some embodiments.

This disclosure is drawn, inter alia, to methods, apparatus, computer programs and systems related to antenna systems used in wireless communications. Referring to FIG. 1, an adaptive antenna array system 10 for use in wireless local area networks (WLAN) and personal area networks (PAN) is shown. In response to a pre-determined condition, the adaptive wireless access unit 111 may approximately maximize the directivity of its antenna in a desired direction and simultaneously reduce the radiation in non-desired directions, such that the quality of a communications link between a communications device 121 and the wireless network 100 may be significantly improved.

Briefly stated, the multiple embodiments of the present disclosure include methods of implementing an adaptive antenna array in a wireless network. An adaptive antenna array is located within an adaptive wireless access unit may not provide wireless access to a communications device until a predetermined condition is satisfied. The adaptive antenna array system can be configured with one or more pre-determined conditions to determine when the adaptive wireless access unit should provide the communications device with wireless access.

The present disclosure includes an adaptive antenna array system that may include a communications device configured to receive wireless access to a wireless network from a default wireless access unit or from an adaptive wireless access unit based on whether a pre-determined condition has been satisfied. The adaptive wireless access unit provides wireless access to wireless network for the communications device when a pre-determined condition has been satisfied but until an end condition occurs. The communications device is reassigned to the default wireless access unit, which provides the communications with wireless access to the wireless network.

FIG. 1 is a system diagram illustrating an adaptive antenna array system 10 that is arranged in accordance with some embodiments of the present disclosure. The adaptive antenna array system 10 includes a communications device 121 within a wireless network 100 having a default wireless access unit 101 and an adaptive wireless access unit 111, both wireless access units serving as wireless access points. Although shown in FIG. 1 at Locations A and B, respectively, the wireless access units 101, 111 may be located anywhere within the wireless network 100. The communications device 121 at Location C may be arranged to connect (i.e., establish a communication link) to either the default wireless access unit 101 or the adaptive wireless access unit 111, provided the communications device 121 receives a cognizable signal from the default wireless access unit 101 and the adaptive wireless access unit 111. The default wireless access unit 101 and the adaptive wireless access unit 111 may be in communication with each other via a communications channel 105. In some embodiments, the communications channel 105 may be a wired connection that may be any physical connection capable of transmitting data, including but not limited to coaxial cable, fiber optics, USB, FireWire, or serial cable. In other embodiments the communications channel 105 may be a wireless connection that may utilize any wireless communications protocol generally known in the art including, but not limited to any IEEE 802.11 wireless communication standard or Bluetooth communication standards. The adaptive antenna array system 10 need not be limited to one adaptive antenna wireless access unit 111, but may have additional adaptive wireless access units (not shown) located throughout the wireless network 100.

The default wireless access unit 101 may include a processor 103 and a default antenna element 102, selected from different types of antenna elements including, but not limited to monopole, dipole, patch, line, or loop. In some embodiments, the default antenna element 102 may produce a generally omni-directional radiation pattern. As shown in FIG. 1, the default antenna element 102 may be a monopole antenna, but it is understood that the default antenna element is not limited to a monopole antenna; and selection of the default antenna element 102 may be based in part on the design configuration of the default wireless access unit 101. Furthermore, when referencing the wireless access unit 101 transmitting a radiation pattern in the present disclosure, the default antenna element within the default wireless access unit 101 may be arranged to facilitate such transmission.

The adaptive wireless access unit 111 may include a processor 113 and an adaptive antenna array 112 having a plurality of individual antenna elements 116. The adaptive antenna array 112 may be configured in any number of ways with different types of antennas or antenna elements such as monopole, dipole, patch, or horn configurations. The antenna elements 116 may be arranged in a variety of fixed m×n arrays, provided that the respective adaptive antenna array 112 produces a desired radiation pattern. Regarding references in the present disclosure to the adaptive wireless access unit 111 transmitting a radiation pattern, the adaptive antenna array 112 within the adaptive wireless access unit may be arranged to facilitate such transmission.

The antenna elements 116 in the adaptive antenna array 112 may have a weighting factor 114 associated therewith. The multiple embodiments are described herein with the weighting factor arranged in a matrix configuration; however, in view of the present disclosure, it will appreciate that other, non-matrix configurations of antenna arrays are possible as well. Generally, such weighting factors may be based upon the amplitude and phase of each individual antenna element in a particular antenna array. Accordingly, in some embodiments the group of weighting factors 114 or weighting factor matrix for the adaptive antenna array 112 may have the same configuration as the individual antenna elements 116 in the adaptive antenna array 112. For example, when the antenna elements 116 are arranged in a 2×2 configuration, the weighting factor matrix for the array 112 may also be in the form of a 2×2 matrix. In the embodiment of FIG. 1, the adaptive wireless access unit 111 may have a 2×3 array of patch antenna elements 116. Accordingly, weighting factor 114 is a 2×3 matrix.

In light of the present disclosure, it will be appreciated that the weighting factor of an antenna element may determine the radiation pattern produced by that antenna element, and thus the particular antenna array to which the antenna element is part. The radiation pattern may be described as a plot of the radiation received at a given distance from the source. By adjusting the amplitude and phase components of each individual antenna element 116, it may be possible to customize the weighting factor 114, the weighting factor matrix, and thus the radiation pattern of the antenna array 112 and the corresponding adaptive wireless access unit 111.

In some embodiments, the amplitude and phase components of the antenna elements 116 may be based upon an electrical excitation signal. The strength of the electrical excitation signal may be controlled by a processor 113 associated with the adaptive wireless access unit 111, which may be electrically coupled to the respective antenna elements 116. The weighting factors 114 associated with the antenna elements may be approximately optimized to increase the directivity of the antenna in the direction of a user 120, thereby reducing spurious radiation (e.g., radiation transmitted in unwanted directions). This may be accomplished by the processor 113 exciting the different antenna elements 116 with different electrical signals (e.g., different excitation voltages or excitation currents). The antenna elements may be excited using a variety of feeding techniques (e.g., microstrip line feed, probe feed, aperture-coupled feed, and proximity-coupled feed, etc.), providing a path for an electrical signal to excite the individual antenna elements 116.

The size and shape of each antenna element 116 may determine the operating frequency of the wireless access unit, although the wireless access unit is not limited to one particular frequency band. In the adaptive antenna array system 10 of FIG. 1, the default wireless access unit 101 and the adaptive wireless access unit 111 may operate in any frequency band where a communications device 121 may be capable of communicating with the wireless network 100. In some embodiments, the default wireless access unit 101 and the adaptive wireless access unit 111 may be arranged to operate in the ultra high frequency (UHF) range. The UHF range may have a frequency range of approximately 300 MHz to approximately 3 GHz. In other embodiments, the wireless access units 101, 111 may be arranged to operate in a super high frequency (SHF) range. The SHF range may have a frequency range of approximately 3 GHz to approximately 30 GHz.

The adaptive antenna array system 10 may include a communications device 121 that may be any device capable of transmitting and receiving data using an electromagnetic signal. The communications device 121 may be located in the wireless network 100 to transmit and receive data to/from one or more other communications devices (not shown) located in a different network. For example, the communications device 121 may be a laptop computer, personal data assistant (PDA), mobile phone, video game system, portable video game system, or portable music player. In some embodiments, the communications device 121 is controlled by a user 120, whom desires wireless access to the wireless network 100. The communications device 121 may be arranged to communicate with either the default wireless access unit 101 or the adaptive wireless access unit 111 located in the wireless network 100 via communications channels 106, 107, respectively. The communications channels 106, 107 are generally a wireless connection that may utilize any wireless communications protocol including, but not limited to any IEEE 802.11 communications standard or Bluetooth communications standard. In some embodiments, the communications device 121 may initially receive wireless access from the default wireless access unit 101 via the communications channel 106. While the communications device 121 may receive a cognizable signal from the adaptive wireless access unit 111, the communications device 121 may be unable to receive wireless access via the adaptive wireless access unit 111 until pre-determined conditions are satisfied.

The processors 103, 113 may be arranged to communicate with each other via the communications channel 105 to determine which wireless access unit 101, 111 may provide the communication device 121 with access to the wireless network 100. Pre-determined conditions may be stored in a memory (not shown) of the wireless access units 101, 111. When a pre-determined condition is satisfied, the communications device 121 may be assigned to the adaptive wireless access unit 111. The pre-determined condition may generally be an event that causes communications device 121 to receive wireless access from the adaptive wireless access unit 111 instead of the default wireless access unit 101. The processor 103 of the default wireless access unit 101 may be arranged to communicate this assignment information to the processor 113 of the adaptive wireless access unit 111. In response, the adaptive wireless access unit 111 may be arranged to adjust one or more weighting factors 114 to provide the communications device 121 with signal coverage via the communications channel 107.

Figure 2:
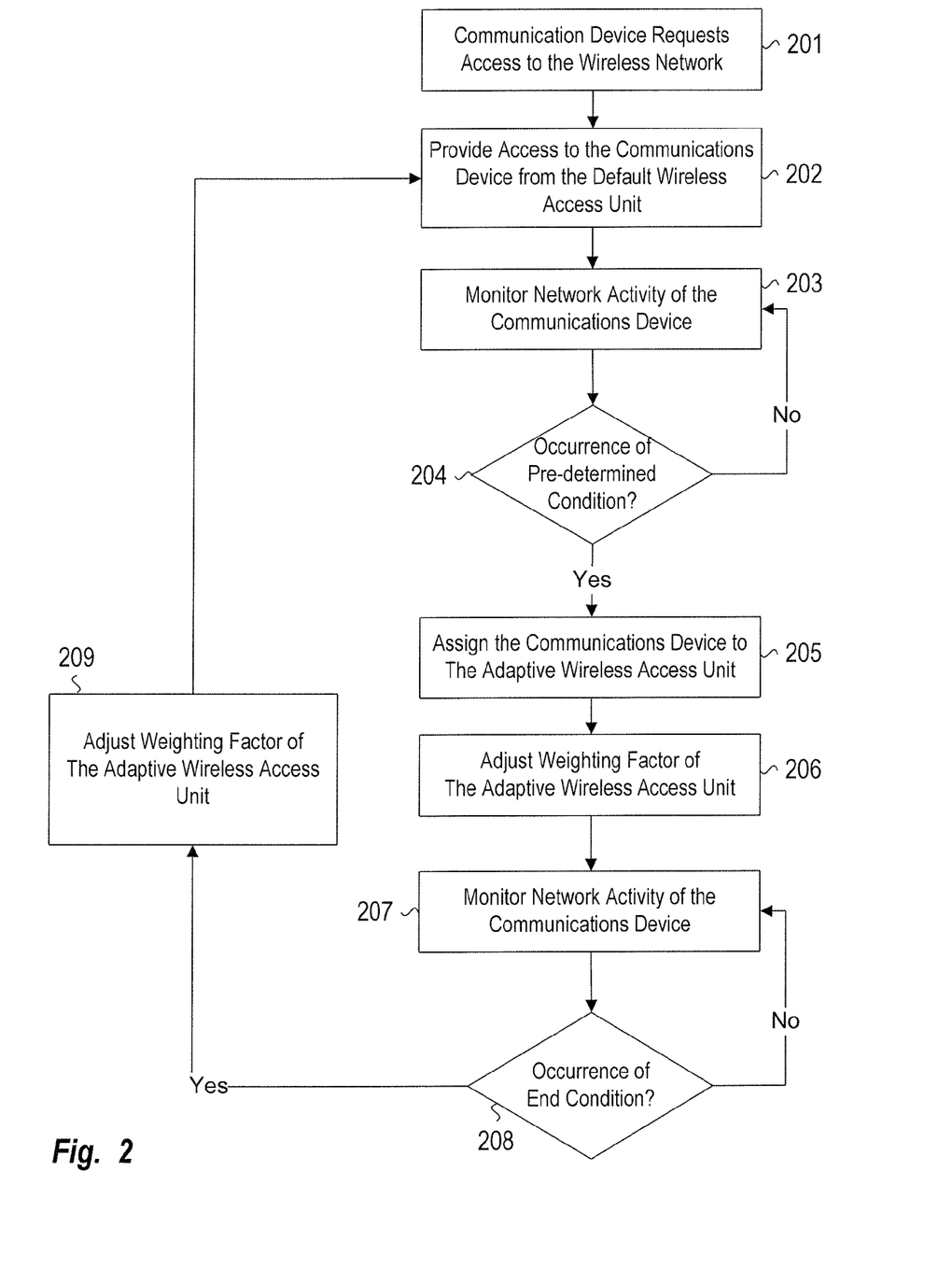
FIG. 2 is a flow diagram illustrating the adaptive antenna array system of FIG. 1.

Referring to FIG. 2, a flow chart demonstrating the sequence of events for the communications device 121 receiving wireless access from the default wireless access unit 101 and the adaptive wireless access unit 111 is shown, in accordance with some embodiments of the present disclosure. The flow chart illustrates processing operations/functions in blocks 201-209. In FIG. 2, blocks 201-209 are illustrated as being performed sequentially, with block 201 first and block 209 last. It will be appreciated however that these blocks may be combined, separated, and/or re-ordered as convenient to suit particular embodiments, and that these blocks or portions thereof may be performed concurrently in some embodiments. Additionally, in some embodiments, various blocks may be eliminated, while in other embodiments additional blocks may be inserted between those depicted in FIG. 2.

In block 201, the communications device 121 may request access to the wireless network 100. In block 202, access to the wireless network is provided to the communications device 121 from the default wireless access network 101 by default. The default wireless access unit 101 may provide communications device 121 with access to the wireless network 100 by providing signal coverage to communications device 121. The processor 103 may monitor the network activity of communications device 121 in block 203 to determine whether the network activity satisfies a pre-determined condition. If a predetermined condition fails to be satisfied, the processor 103 may continue to monitor the network activity of communications device 121.

The determination of occurrence of a pre-determined condition in block 204 may determine whether the adaptive wireless access unit 111 may provide communications device 121 with wireless access. The pre-determined condition may be an event that causes communications device 121 to receive wireless access from the adaptive wireless access unit 111 instead of the default wireless access unit 101. In one embodiment, the pre-determined condition may be whether the communications device 121 requests a file size above a minimum threshold file size. In another embodiment, the pre-determined condition may be whether communications device 121 requests access to a pre-approved website. In another embodiment, the pre-determined condition may be whether an access code received from the communications device 121 may be sufficient to provide communications device 121 with signal coverage from the adaptive wireless access unit 111. The pre-determined conditions may not be limited to those examples described above, but may be established by an administrator of a wireless network to meet the needs of that particular wireless network.

In block 205, the communications device 121 may be assigned to the adaptive wireless access unit 111 when a pre-determined condition is satisfied. The processor 103 may transmit data to the processor 113 via the communications channel 105, the data including information about the assignment of the communications device 121 to the adaptive wireless access unit 111. In response to the transmitted data, in block 206, the adaptive wireless access unit 111 may adjust the weighting factor 114 to provide the communications device 121 with signal coverage. The processor 103 of the default adaptive wireless access unit 101 and/or the processor 113 of the adaptive wireless access unit 111 may monitor the network traffic activity of the communications device 121 in block 207.

In block 208, network activity is evaluated and a determination may be made as to whether an end condition is satisfied. The determination made be made by either processor 103 of the default wireless access unit 101 or the processor 113 of the adaptive wireless access unit 111 If an end condition fails to be satisfied, then the processors 103, 113 may continue to monitor the network activity of communications device 121. The end condition may generally be an event that may cause communications device 121 to receive wireless access from the default wireless access unit 101 instead of the adaptive wireless access unit 111. In one embodiment, the end condition may be whether communications device 121 has completed a download. In another embodiment, the end condition may be whether communications device 121 visits or attempts to access a non-approved website. In another embodiment, the end condition may be the expiration or invalidation of an access code. The end conditions are not limited to those examples described above, but may be established by an administrator of a wireless network to meet the needs of that particular wireless network.

In response to determining an occurrence of an end condition, the processor 113 may adjust one or more weighting factors 114 in block 209, such that the communications device 121 may be unable to obtain wireless access from the adaptive wireless access unit 111 (even though the communications device may receive a cognizable wireless signal from the adaptive wireless access unit 111). Thus, the communications device 121 may not be able to receive wireless access from the adaptive wireless access unit 111 in the event of another pre-determined condition unless it receives a cognizable wireless signal from the adaptive wireless access unit 111. Although the communications device 121 may receive a cognizable wireless signal, the processor 113 may not provide wireless access to it unless it receives an assignment from processor 103. Communications device 121 may be re-assigned back to the default wireless access unit 101, which may provide communications device 121 with wireless access.

Figure 3:
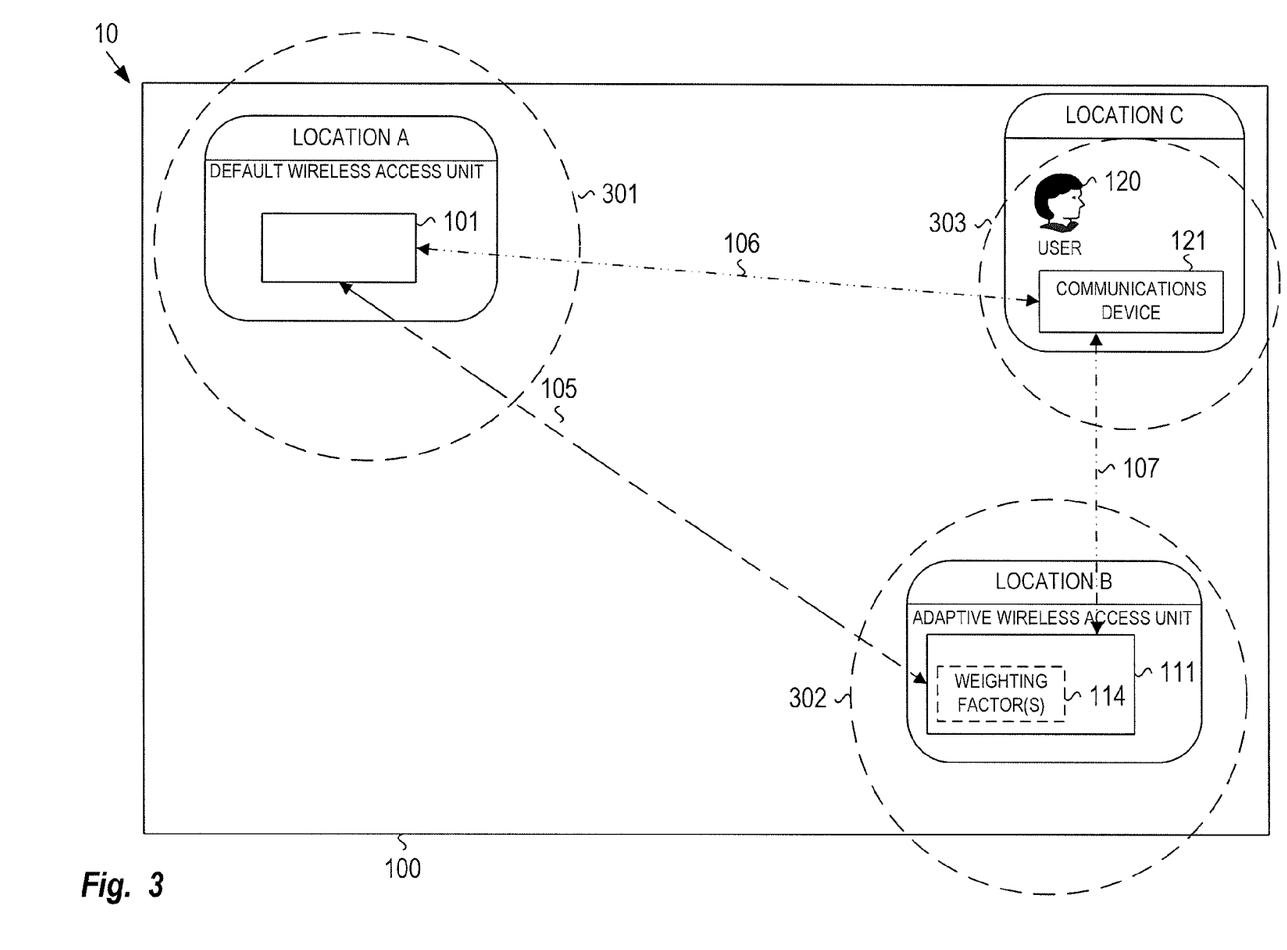
FIG. 3 is a system diagram illustrating the adaptive antenna array system of FIG. 1 showing an example of initial radiation patterns.

Referring to FIG. 3, initial radiation patterns 301, 302, 303 of the wireless access units 101, 111 and the communications device 121, respectively are shown in accordance with various embodiments of the present disclosure. The radiation patterns 301, 302, 303 may generally indicate the relative signal strength of the wireless access units 101, 111 and the communications device 121 in a particular direction. That is, the size of or area covered by the radiation patterns depicted may represent the general signal strength relative to the other radiation patterns present in the wireless network 100. Initially, the strength of the signals transmitted by wireless access units 101, 111 may be approximately equal, but may be larger than the radiation pattern 303 of the communications device 121.

In the example of FIG. 3, the radiation patterns 301, 302, 303 may generally be omni-directional, meaning that the devices to which the respective radiation patterns correspond (i.e., the wireless access units 101, 111 and the communications device 121) may radiate and receive radiation generally equally in/from all directions. The zero axis reference point for a particular wireless access unit may generally be near the center of that wireless access unit. In some embodiments, the radiation pattern 301 for the default wireless access unit 101 may change in strength depending on how the processor 103 excites the default antenna element 102, but will exhibit a generally omni-directional radiation pattern. In various embodiments, the initial radiation patterns may be determined by the type of antenna elements used and the strength of the excitation signal for each antenna element. For example, when the default antenna element 102 in the default wireless access unit 101 uses a dipole antenna, then the initial radiation pattern of the default wireless access unit 101 may resemble a Hertzian dipole pattern. Although FIG. 3 depicts the initial radiation patterns 301, 302, 303 as being generally omni-directional, in view of the present disclosure, the wireless access units 101, 111 and the communications device 121 are not limited to omni-directional initial radiation patterns.

Figure 4:
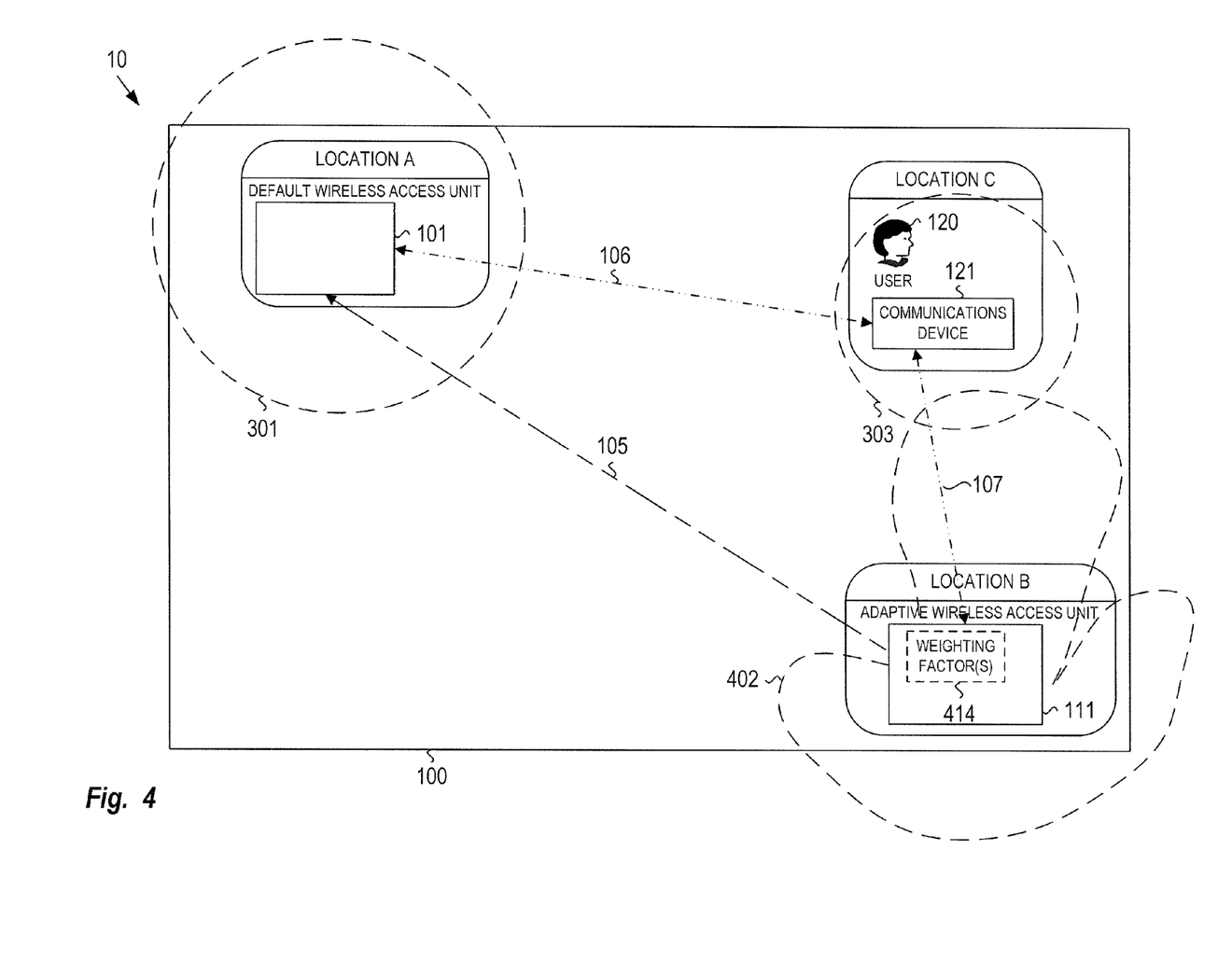
FIG. 4 is a system diagram illustrating the adaptive antenna array system of FIG. 1 showing an example of adjusted radiation patterns.

Referring to FIG. 4, the radiation pattern of the adaptive wireless access unit 111 in response to pre-determined conditions being satisfied (e.g., block 204 in FIG. 2) is shown, in accordance with various embodiments of the present disclosure. The adaptive wireless access unit 111 may be arranged to modify one or more of the weighting factors 114 (see FIG. 1) to weighting factors 414 (see FIG. 4) to produce an alternate radiation pattern 402. The processor 103 may be configured to inform the processor 113 via the communications channel 105 that the communications device 121 may now be assigned to the adaptive wireless access unit 111. The communications device 121 may be adapted to provide feedback to the adaptive wireless access unit 111 in order to approximately optimize the weighting factor 414.

The optimization process may involve several iterations of the wireless access unit processor 113 adjusting one or more weighting factors based on the feedback received from the communications device 121 until a threshold signal strength may be received by the communications device 121. The threshold signal strength may be the strength of a signal needed by the communications device 121 to minimize the number of error bits transmitted and received by the communication device 121.

In FIG. 4, the weighting factors 414 may cause the adaptive wireless access unit 111 to have a highly directional radiation pattern 402. The directivity of an antenna may be considered as a measure of the concentration of the radiated power in a particular direction, and thus may be regarded as the ability of the antenna to direct radiated power in a given direction. An antenna with a highly directional radiation pattern may be capable of transmitting data in a particular direction and minimizing the radiation that is transmitted in other directions. Thus, in some embodiments the strength of the signal transmitted from the antenna array 112 using weighting factors 414 in the adaptive wireless access unit 111 may be strong enough to communicate with communication devices assigned to the adaptive wireless network unit 111 in wireless network 100, but may otherwise generally fail to provide sufficient power to communication with devices outside of the network 100. Communication devices not assigned to the adaptive wireless access unit 111 may receive a cognizable signal, but may otherwise be unable to obtain wireless access from the adaptive wireless access unit 111. When an end condition is satisfied, the adaptive wireless access unit 111 may adjust one or more weighting factors such that the communications device 121 may receive a cognizable signal, but may otherwise be unable to obtain wireless access from the adaptive wireless access unit 111. Although the radiation pattern 402 shown in FIG. 4 may be a typical radiation pattern, any radiation pattern that provides optimal or directional coverage to the communications devices in the network 100 may be employed by the adaptive wireless access unit 111.

A number of calculations may be implemented by the adaptive wireless access unit processor 113 to calculate approximately optimal weighting factors 414 and thus the weighting factor matrix for the antenna array 112 to produce an approximately optimal radiation pattern (e.g., the alternate radiation pattern 402 in FIG. 4) for the adaptive wireless access unit 111. In some embodiments, such calculations may be based on measurements of the signal strength received by a communications device 121, the particular location of the communications device 121, and/or the weighting factors received from the other wireless access units located in the wireless network 100. In various embodiments, the calculations may be computed when a change in the wireless network configuration occurs (e.g., new communications device, wireless access unit failure, communication device movement, etc.). The wireless access unit processors 113 may be arranged to compute the weighting factor(s) 414 using techniques such as Multiple Signal Classification, Estimation of Signal Parameters via Rotational Invariant Techniques, etc.

Figure 5:
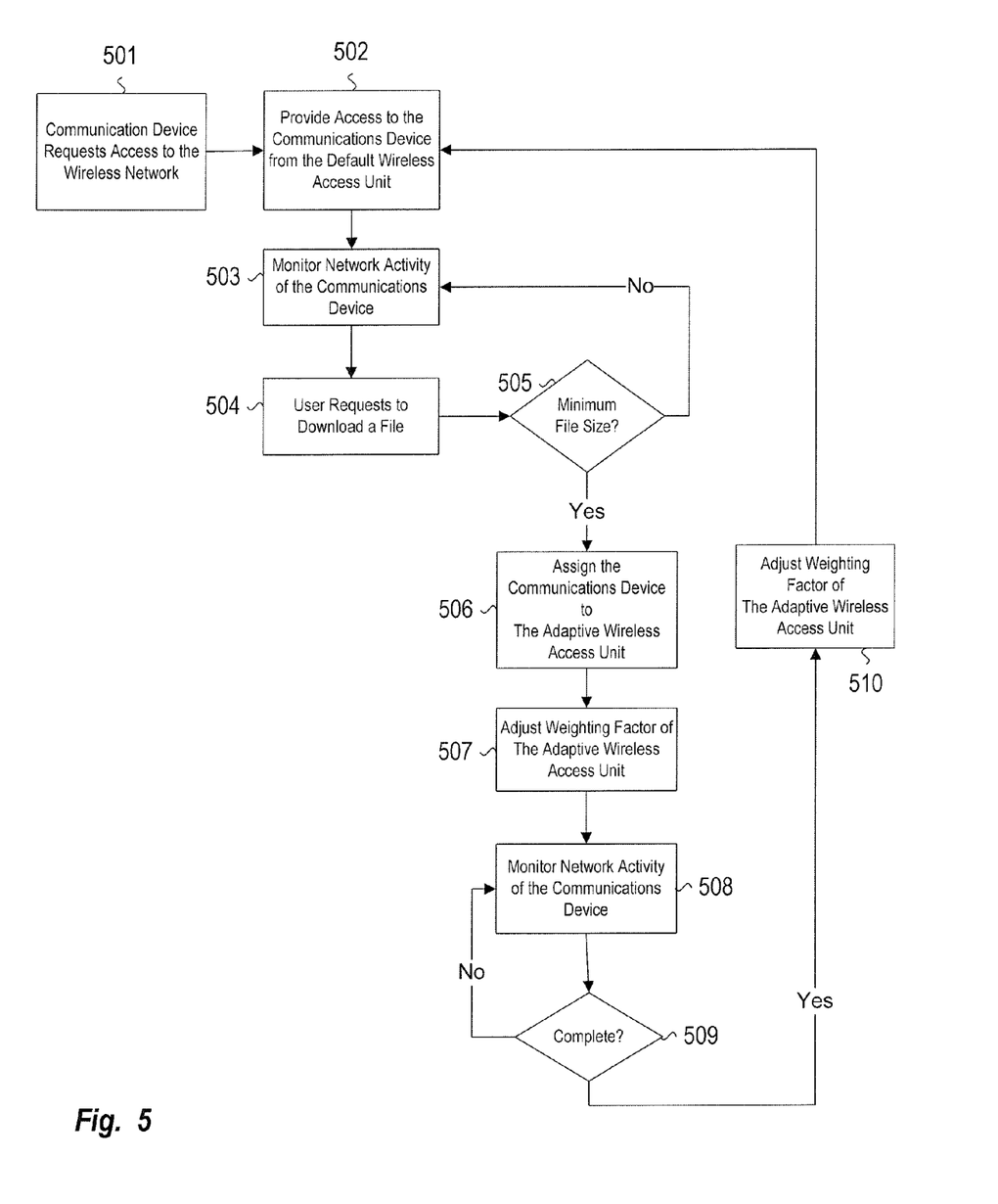
FIG. 5 is a flow diagram illustrating the adaptive antenna array system of FIG. 1 according to some embodiments.

Referring to FIG. 5, a flow chart depicting the transition of communications device 121 from the default wireless access unit 101 to the adaptive wireless access unit 111 according to some embodiments of the present disclosure is shown. The flow chart illustrates processing operations/functions in blocks 501-510. In FIG. 5, blocks 501-510 are illustrated as being performed sequentially, with block 501 first and block 510 last. It will be appreciated however that these blocks may be combined, separated, and/or re-ordered as convenient to suit particular embodiments, and that these blocks or portions thereof may be performed concurrently in some embodiments. Additionally, in some embodiments, various blocks may be eliminated, while in other embodiments additional blocks may be inserted between those depicted in FIG. 5.

In block 501, the communications device 121 may request access to the wireless network 100. The adaptive antenna array system 10 may initially provide the communications device 121 access to the wireless network from the default wireless access unit 111 in block 502. The processor 103 of the default wireless access unit 101, in block 503, may monitor the network activity of communications device 121. In block 504, the user 120 may request to download a file to the communications device 121. The processor 103 may evaluate the network activity and determine whether the requested file is larger than a minimum file size in block 505. If the file size is above the required minimum file size, in block 506 communications device 121 may be assigned to the adaptive wireless access unit 111. Otherwise, the communications device 121 may remain assigned to the default wireless access unit 101 and the processor 103 may monitor the network traffic of communications device 121 to determine if a pre-determined condition is satisfied.

Still referring to FIG. 5, as previously described, the adaptive wireless access unit 111 may adjust one or more weighting factors 114 in block 507. Either processor 103 or 113 may monitor the network activity of communications device 121 in block 508 to determine, as shown in block 509, whether the communications has completed downloading the requested file. If the download is not completed, then the communications device 121 may remain assigned to the adaptive wireless access unit 111. If either of the processors 103, 113 determines that the download is completed, in block 510, the processor 113 may adjust one or more weighting factors 114 to provide communications device 121 with a cognizable wireless signal, but communications device 121 may be unable to obtain wireless access from the adaptive wireless access unit 111. The communications device 121 may be reassigned back to the default wireless access unit 101, which may provide wireless access to the communications device 121.

The above described example may be applicable to downloading content from online content providers, such as iTunes® or Amazon.com®. This embodiment may also be applicable, for example to downloading operating system and/or program updates.

Figure 6:
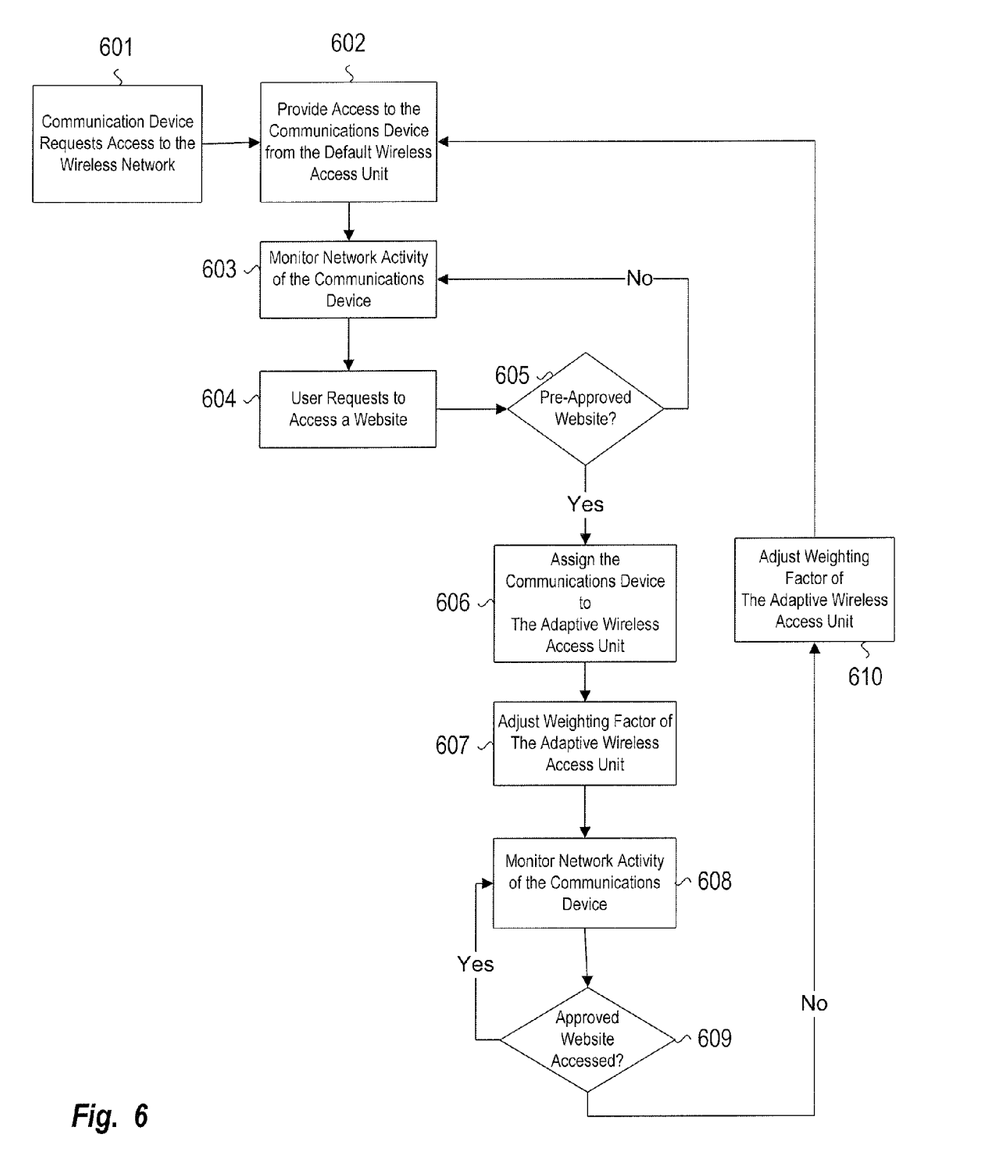
FIG. 6 is a flow diagram illustrating the adaptive antenna array system of FIG. 1 according to some embodiments.

Referring to FIG. 6, a flow chart depicting the transition of communications device 121 from the default wireless access unit 101 to the adaptive wireless access unit 111 according to various embodiments of the present disclosure is shown. The flow chart illustrates processing operations/functions in blocks 601-610. In FIG. 6, blocks 601-610 are illustrated as being performed sequentially, with block 601 first and block 610 last. It will be appreciated however that these blocks may be combined, separated, and/or re-ordered as convenient to suit particular embodiments, and that these blocks or portions thereof may be performed concurrently in some embodiments. Additionally, in some embodiments, various blocks may be eliminated, while in other embodiments additional blocks may be inserted between those depicted in FIG. 6.

In block 601, the communications device 121 may request access to the wireless network 100. The adaptive antenna array system 10 may initially provide the communications device 121 access to the wireless network from the default wireless access unit 101 in block 602. The processor 103 of the default wireless access unit 101, in block 603, may monitor the network activity of communications device 121. In block 604, the user 120 may request to visit a particular website. In block 605 the processor 103 may evaluate the network activity and determine whether the requested website is a pre-approved website. If the website is a pre-approved website, in block 606 the communications device 121 may be assigned to the adaptive wireless access unit 111. Otherwise, the communications device 121 may remain assigned to the default wireless access unit 101 and the processor 103 may monitor the network traffic of the communications device 121 to determine if a pre-determined condition is satisfied.

As previously described, the adaptive wireless access unit 111 may adjust one or more weighting factors 114 in block 607. Either of the processors 103, 113 may monitor the network activity of communications device 121 in block 608 to determine, as shown in block 609, whether the communications device has accessed a pre-approved website. If the website accessed is a pre-approved website, the communications device 121 may remain assigned to the adaptive wireless access unit 111. If either processor 103, 113 determines that the communications device 121 has accessed a non-approved website, in block 610 the processor 113 may adjust one or more weighting factors 114 to provide communications device 121 with a cognizable wireless signal, but communications device 121 may be unable to obtain wireless access from the adaptive wireless access unit 111. The communications device 121 may be reassigned back to the default wireless access unit 101, which may provide wireless access to the communications device 121.

The above-described example may be applicable to businesses that want to encourage mobile transactions or mobile banking in public places. This embodiment may also be applicable, for example, to websites, such as Hulu® or Netflix®, that stream content online.

Figure 7:
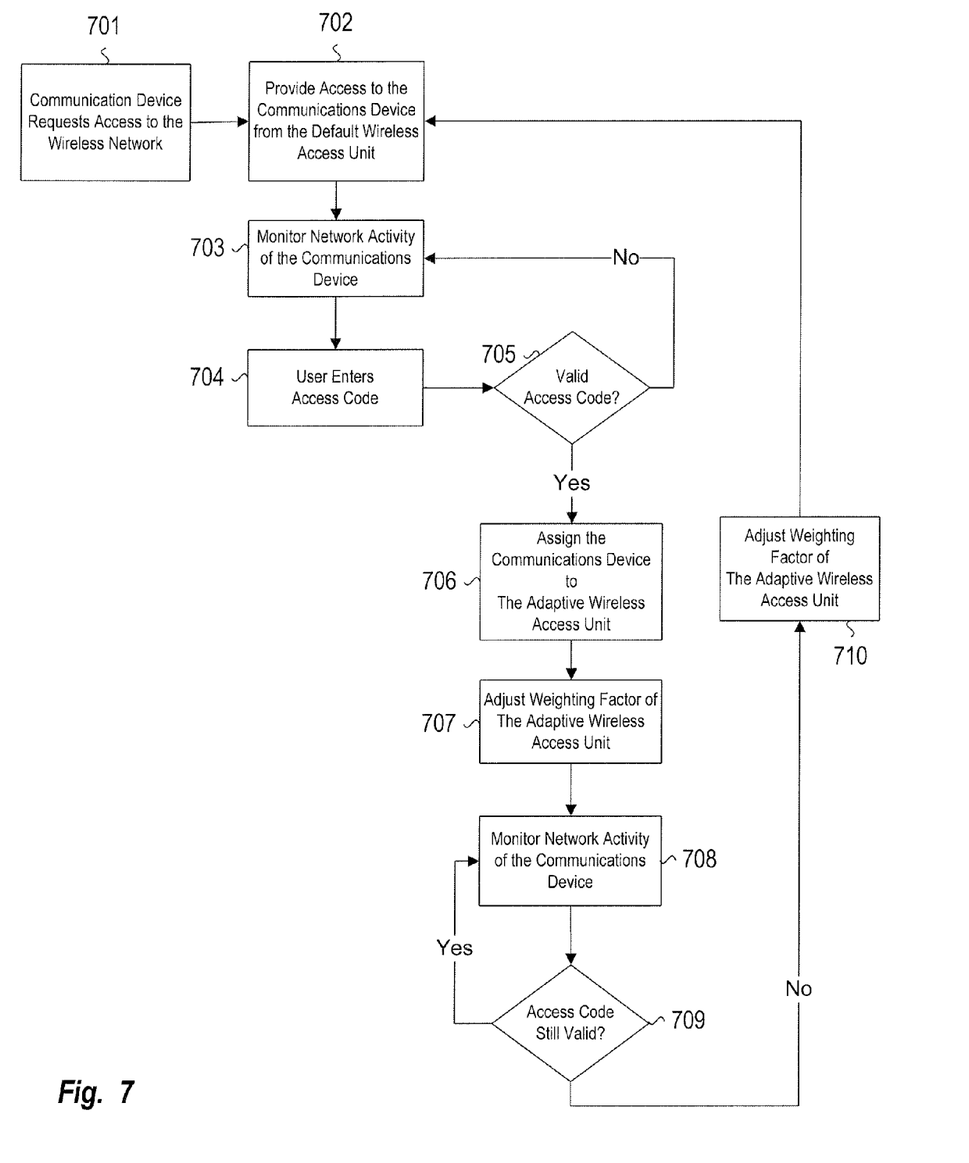
FIG. 7 is a flow diagram illustrating the adaptive antenna array system of FIG. 1 according to some embodiments.

Referring to FIG. 7, a flow chart depicting the transition of the communications device 121 from the default wireless access unit 101 to the adaptive wireless access unit 111 according to various embodiments of the present disclosure is shown. The flow chart illustrates processing operations/functions in blocks 701-710. In FIG. 7, blocks 701-710 are illustrated as being performed sequentially, with block 701 first and block 710 last. It will be appreciated however that these blocks may be combined, separated, and/or re-ordered as convenient to suit particular embodiments, and that these blocks or portions thereof may be performed concurrently in some embodiments. Additionally, in some embodiments, various blocks may be eliminated, while in other embodiments additional blocks may be inserted between those depicted in FIG. 7.

In block 701, the communications device 121 may request access to the wireless network 100. The adaptive antenna array system 10 may initially provide the communications device 121 access to the wireless network from the default wireless access unit 101 in block 702. The processor 103 of the default wireless access unit 101, in block 703, may monitor the network activity of communications device 121. In block 704, the user 120 may enter an access code to the communications device 121, which may transmit the access code to the default wireless access unit 101. In block 705, the processor 103 may evaluate the network activity and determine whether the access code is a valid access code. For example, a place of business might encourage customers to use its wireless network by providing them with a premier wireless service if they purchase goods or services above a specified amount. If the access code is valid, in block 706 the communications device 121 may be assigned to the adaptive wireless access unit. Otherwise, the communications device 121 may remain assigned to the default wireless access unit 101 and the processor 103 may monitor the network traffic of communications device 121 to determine if a pre-determined condition is satisfied.

The above-described example may be applicable to wireless networks with two wireless access tiers. For example, a place of business may have a wireless access unit for regular customers, but then offer a preferred customer wireless access unit for customers that meet certain standards. This example may also be applicable to a work environment where there may be a guest wireless access unit and an employee wireless access unit.

As previously described, the adaptive wireless access unit 111 may adjust one or more weighting factors 114 in block 707. Either the processor 103 or processor 113 may monitor the network activity of the communications device 121 in block 708 to determine, as shown in block 709, whether the access code is still valid. If the access code is still valid, the communications device 121 may remain assigned to the adaptive wireless access unit. If either processor 103 or 113 determines that the communications device 121 is no longer valid, in block 710 the processor 113 may adjust one or more weighting factors 114 to provide communications device 121 with a cognizable wireless signal, but communications device 121 may be unable to obtain wireless access from the adaptive wireless access unit 111. The communications device 121 may be reassigned back to the default wireless access unit 101, which may provide wireless access to the communications device 121.

The above-described example may be applicable to businesses that offer wireless access hotspots where the access code for the adaptive wireless access unit is provided to users through a receipt, email, text message, or any other communication means generally known in the art.

Figure 8:
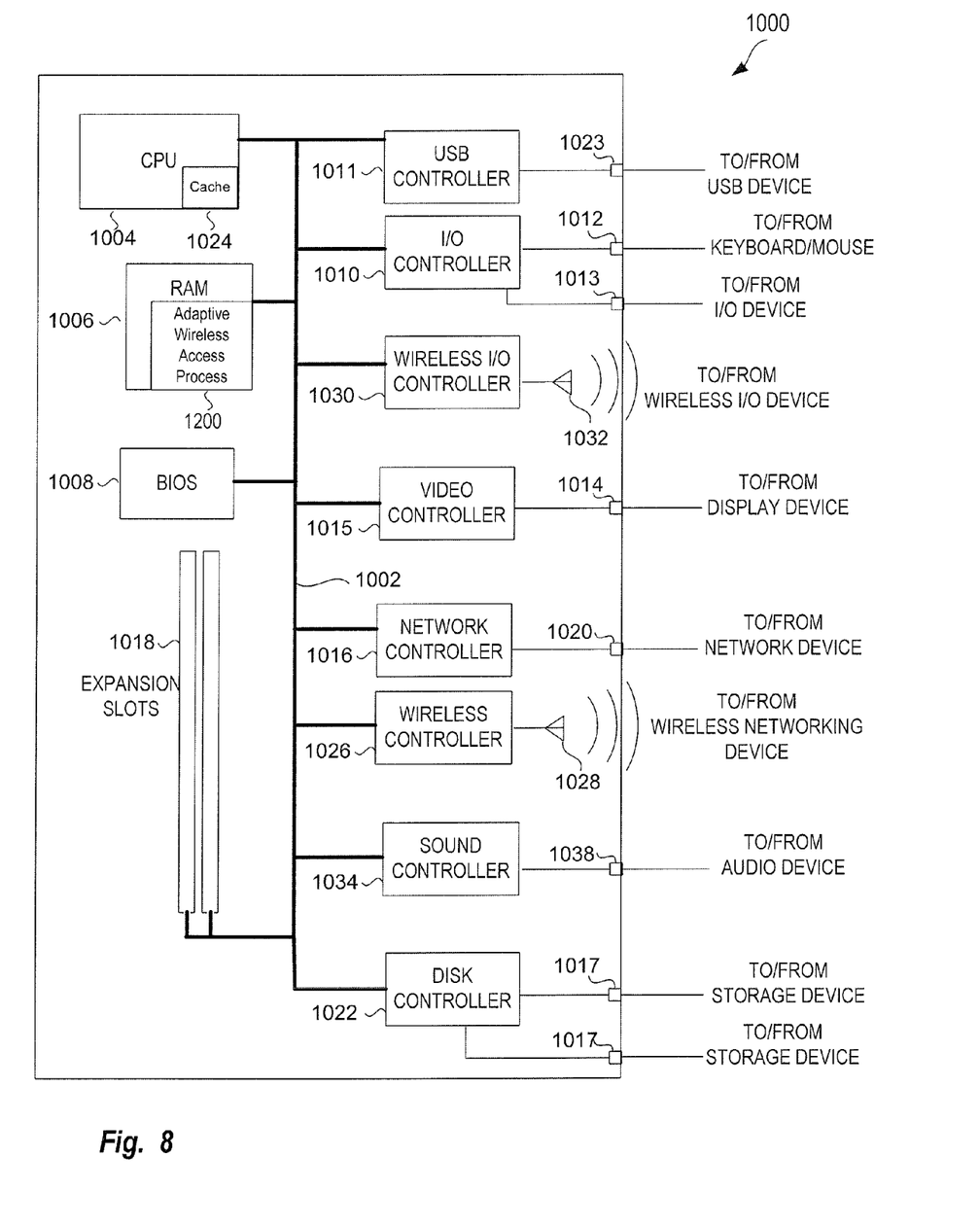
FIG. 8 is a block diagram illustrating a computer system according to some embodiments; all in accordance with the present disclosure.

FIG. 8 is a block diagram illustrating a computer architecture or system 1000 through which the presently disclosed embodiments of the adaptive antenna array system 10, including the processors 103, 113 (or portions thereof), may be realized and/or implemented. A system bus 1002 may be arranged to transport data amongst the Central Processing Unit (CPU) 1004, RAM 1006, the Basic Input Output System (BIOS) 1008 and other components. The CPU 1004 may include a cache memory component 1024. The RAM 1006 may include an adaptive wireless access process 1200. The adaptive wireless access process 1200 may be arranged to determine whether to provide communications device 121 with wireless access. The computer system 1000 may include one or more external storage ports 1017 for accessing a hard disk drive (HDD), optical storage drive (e.g., CD-ROM, DVD-ROM, DVD-RW), flash memory, tape device, or other storage device (not shown). The relevant storage device(s) may be connected or coupled through the external storage port 1017, which may be connected or coupled to the system bus 1002 via a disk controller 1022. A keyboard and pointing device (e.g. mouse. touch pad) (not shown) can be connected or coupled to the keyboard/mouse port(s) 1012, and other I/O devices could be connected or coupled to additional I/O port(s) 1013, which may be connected or coupled to the system bus 1002 through the I/O controller 1010. Additional ports or devices, such as serial ports, parallel ports, firewire adapters, or biometric devices (not shown), may be utilized through the I/O controller 1010. A display device (not shown) can be connected or coupled to a display device port 1014, which may be connected or coupled to the system bus 1002 through the video controller 1015. A network device (not shown), including but not limited to an Ethernet device or other device having networking capability, can be connected or coupled to a network port 1020, which may be connected or coupled through the network controller 1016 to the system bus 1002. The computer system 1000 may be wirelessly connected or coupled to a network device that may be configured for wireless operation (not shown), including but not limited to wireless routers, using an antenna 1028 connected or coupled to a wireless controller 1026, which may be connected or coupled to the system bus 1002, where the antenna may be arranged to transmit/receive signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected or coupled to the USB port 1023, which may be connected or coupled to the system bus 1002 through the USB controller 1011. Other devices, such as cellular phones, PDAs, and other portable devices may also be connected wirelessly via a wireless I/O antenna 1032 that is connected or coupled to a wireless I/O controller 1030. Examples of wireless I/O technologies include, but are not limited to, Bluetooth, Infrared (IR), and Radio-Frequency (RF). Audio devices, such as microphones, speakers, or headphones may be connected or coupled to a sound port 1038 that may be connected or coupled to a sound controller 1034 that may be connected or coupled to the system bus 1002. Expansion slots 1018 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect or coupled network cards, video cards, sound cards, modems and any other peripheral devices generally used with a computer. The computer system 1000 also includes a source of power (not shown), including but not limited to a power supply connected or coupled to an external source of power, and an internal or external battery. Detailed descriptions of these devices have been omitted for convenience only and should not be construed as limiting.

The embodiments of the present disclosure may be implemented with any combination of hardware and software. If implemented as a computer-implemented apparatus, the embodiment is implemented using means for performing all of the blocks and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for adaptively assigning a communications device to a wireless access point in a wireless network, comprising:
 a default wireless access unit having a default wireless access unit processor, the default wireless access unit being configured to provide the communications device with access to the wireless network and to evaluate network activity of the communications device to determine if the network activity satisfies a pre-determined condition; and
 an adaptive wireless access unit having an adaptive wireless access unit processor configured to control one or more adaptive wireless access unit weighting factors, the adaptive wireless access unit being configured to provide the communications device with access to the wireless network in response to the pre-determined condition being satisfied, wherein
 the adaptive wireless access unit is further configured to evaluate a signal strength associated with communications between the adaptive wireless access unit and the communications device, and modify one or more of the adaptive wireless access unit weighting factors corresponding to antenna elements included in an adaptive antenna array associated with the adaptive wireless access unit until the communications device receives a signal exceeding a threshold signal strength from the adaptive wireless access unit, and the adaptive wireless access unit processor is further configured to determine if the network activity of the communications device satisfies an end condition, and modify one or more of the adaptive wireless access unit weighting factors to disable wireless access between the communications device and the adaptive wireless access unit when the end condition is satisfied.

2. A method for a default wireless access unit to adaptively assign a communications device to communicate with a wireless network using either a default wireless access unit or an adaptive wireless access unit, the method for the default wireless access unit comprising:

receiving a request for access to the wireless network from the communication device;

providing access to the wireless network for the communication device using the default wireless access unit in response to the received request;

monitoring network communications for network activity associated with the communications device;

evaluating the network activity associated with the communications device to determine if the network activity satisfies a pre-determined condition;

assigning the communications device to the adaptive wireless access unit when the pre-determined condition is determined to be satisfied, such that the adaptive wireless access unit provides the communications device with access to the wireless network;

evaluating the network activity associated with the communications device to determine if the network activity satisfies an end condition; and re-assigning the communications device to the default wireless access unit when the end condition is determined to be satisfied, such that the default wireless access unit provides the communications device with access to the wireless network.

3. The method of claim 2, wherein the default wireless access unit transmits an instruction to the adaptive wireless access unit in response to the communication device being assigned to the adaptive wireless access unit causing the adaptive wireless access unit to modify one or more adaptive wireless access unit weighting factors to provide the communications device with a cognizable signal.

4. The method of claim 2, wherein the pre-determined condition includes transmission, by the communications device, of a request to download a file having a file size greater than a minimum value.

5. The method of claim 2, wherein the pre-determined condition includes transmission, by the communications device, of a request for content from a pre-approved website.

6. The method of claim 2, wherein the pre-determined condition includes transmission, by the wireless communications device, of an access code.

7. A method for adaptively assigning a communications device using either a default wireless access unit or an adaptive wireless access unit, the method for the adaptive wireless access unit comprising:

receiving from the default wireless access unit an indication of an assignment of the communications device to the adaptive wireless access unit for access of the communications device to the wireless network using the adaptive access unit in response to a determination by the default wireless access unit that a pre-determined condition is satisfied;

evaluating a signal strength associated with communications between the adaptive wireless access unit and the communications device;

modifying one or more weighting factors corresponding to antenna elements included in an adaptive antenna array associated with the adaptive wireless access unit until the signal strength exceeds a threshold signal strength;

providing the communications device with access to the wireless network using the adaptive wireless access unit;

receiving an indication of a re-assignment of the communications device to the default wireless access unit when the network activity is determined to satisfy an end condition; and disabling access to the wireless network using the adaptive wireless access unit for the communications device, such that the default wireless access unit provides the communications device with access to the wireless network.

8. The method of claim 7, wherein the pre-determined condition is determined to be satisfied based on monitoring and evaluating of network activity of the communications device.

9. The method of claim 7, wherein the pre-determined condition is determined to be satisfied based on monitoring and evaluating of the network activity of the communications device.

10. The method of claim 7, wherein the pre-determined condition includes transmission, by the communications device, of a request for content from a pre-approved website.

11. The method of claim 7, wherein the pre-determined condition includes transmission, by the wireless communications device, of an access code.

12. The method of claim 7, wherein the pre-determined condition includes transmission, by the communications device, of a request to download a file having a file size greater than a minimum value.

13. The method of claim 7, wherein prior to modifying one or more of the weighting factors the signal strength of the adaptive wireless access unit received at the communications device is insufficient to establish the communication between the communications device and the adaptive wireless access unit.

14. An article of manufacture for adaptively assigning a communications device to communicate with a wireless network using either a default wireless access unit or an adaptive wireless access unit, the article of manufacture comprising a non-transitory computer-readable medium holding computer-executable instructions for performing a method comprising:

receiving a request for access to the wireless network from the communication device;

providing access to the wireless network for the communication device using the default wireless access unit in response to the received request;

monitoring network communications for network activity associated with the communications device;

evaluating the network activity associated with the communications device to determine if the network activity satisfies a pre-determined condition; and assigning the communications device to the adaptive wireless access unit when the pre-determined condition is determined to be satisfied, such that the adaptive wireless access unit provides the communications device with access to the wireless network;

evaluating the network activity associated with the communications device to determine if the network activity satisfies an end condition; and re-assigning the communications device to the default wireless access unit when the end condition is determined to be satisfied, such that the default wireless access unit provides the communications device with access to the wireless network.

15. An adaptive wireless access unit configured to provide a communications device with access to a wireless network in response to a pre-determined condition being satisfied, the adaptive wireless access unit comprising:

an adaptive wireless access unit processor configured to control one or more adaptive wireless access unit weighting factors, determine if network activity of the communications device satisfies an end condition, and modify one or more of the adaptive wireless access unit weighting factors to disable wireless access between the communications device and the adaptive wireless access unit when the end condition is satisfied; and an adaptive antenna array including one or more antenna elements, wherein the adaptive wireless access unit weighting factors correspond to control of an output signal from each of the one or more antenna elements.

16. A default wireless access unit configured to provide a communications device with access to a wireless network, the default wireless access unit comprising:

a default wireless access unit processor configured to:
monitor network activity of the communications device,
evaluate the network activity of the communications device to determine if the network activity satisfies a pre-determined condition, wherein the pre-determined condition includes one or more of a request by the communications device to download a file having a file size greater than a minimum value, a request by the communications device for content from a pre-approved website, and/or an access code received from the communications device, and
assign the communications device to an adaptive wireless access unit when the pre-determined condition is determined to be satisfied, such that the adaptive wireless access unit provides the communications device with access to the wireless network.

17. The system of claim 1, wherein the end condition is a determination by the adaptive wireless access unit processor that a download of a file is complete.

18. The system of claim 1, wherein the end condition is a determination by the adaptive wireless access unit processor that the communication device has requested content from a non-approved website.

19. The system of claim 1, wherein the end condition is a determination by the adaptive wireless access unit processor that an access code received from a communication device is invalid.

* * * * *

UNITED STATES PATENT AND TRADEMARK OFFICE
CERTIFICATE OF CORRECTION

| | | |
|---|---|---|
| PATENT NO. | : 8,310,947 B2 | |
| APPLICATION NO. | : 12/490702 | |
| DATED | : November 13, 2012 | |
| INVENTOR(S) | : Hwang | |

It is certified that error appears in the above-identified patent and that said Letters Patent is hereby corrected as shown below:

In the Specifications

In Column 2, Line 27, delete "predetermined" and insert -- pre-determined --, therefor.

In Column 5, Line 39, delete "predetermined" and insert -- pre-determined --, therefor.

In Column 8, Line 40, delete "111" and insert -- 101 --, therefor.

In Column 11, Line 18, delete "mouse. touch pad" and insert -- mouse, touch pad --, therefor.

In Column 13, Line 65, delete "farther" and insert -- further --, therefor.

Signed and Sealed this
Fourth Day of June, 2013

Teresa Stanek Rea
*Acting Director of the United States Patent and Trademark Office*